United States Patent

[11] 3,545,793

[72] Inventor Thomas F. Graffy
 Chicago, Ill.
[21] Appl. No. 738,712
[22] Filed June 20, 1968
[45] Patented Dec. 8, 1970
[73] Assignee I-T-E Imperial Corporation
 a corporation of Delaware

[54] FLANGE BREAKAWAY FITTING
 1 Claim, 7 Drawing Figs.
[52] U.S. Cl.................................................. 285/158,
 285/281
[51] Int. Cl..................................................... F16l 27/00
[50] Field of Search............................................ 285/158,
 159, 189, 190(Cursory), 272(Cursory),
 281(Cursory), 280; 287/20(Cursory)

[56] References Cited
UNITED STATES PATENTS
2,522,757 9/1950 Larson.......................... 285/158X
2,749,149 6/1956 Carpenter.................... 285/189

3,198,480 8/1965 Morse.......................... 285/189X
3,290,069 12/1966 Davis............................ 285/341
FOREIGN PATENTS
1,224,164 2/1960 France........................ 285/158

Primary Examiner—David J. Williamowsky
Assistant Examiner—Wayne L. Shedd
Attorney—Hofgren, Wegner, Allen, Stellman & McCord ABSTRACT: An hydraulic flange fitting for connection of a duct such as a tube, pipe or hose to a port. The flanged connection permits swivel adjustability of the fitting relative to the port. The body of the fitting is provided with one or more connecters for providing a breakaway connection of the duct thereto. The breakaway connection may comprise a threaded reusable connection, abrazed seal connection, and the like. The threaded connection may comprise a constrictible sleeve connector wherein the sleeve is permanently associated with the duct end.

PATENTED DEC 8 1970
3,545,793
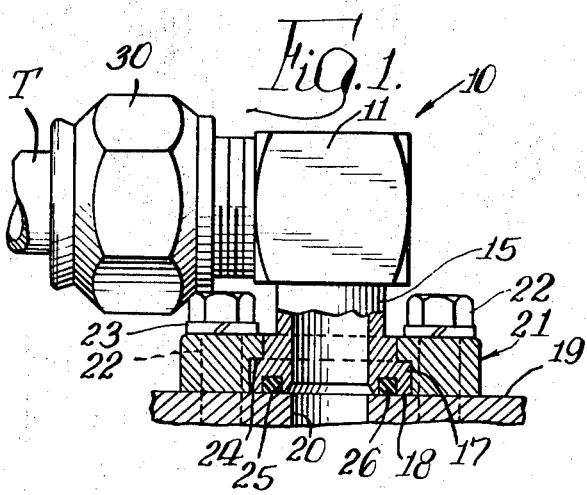
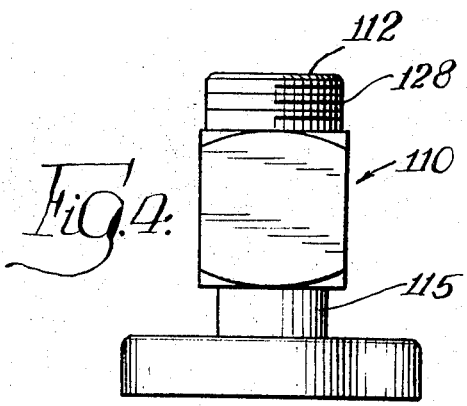
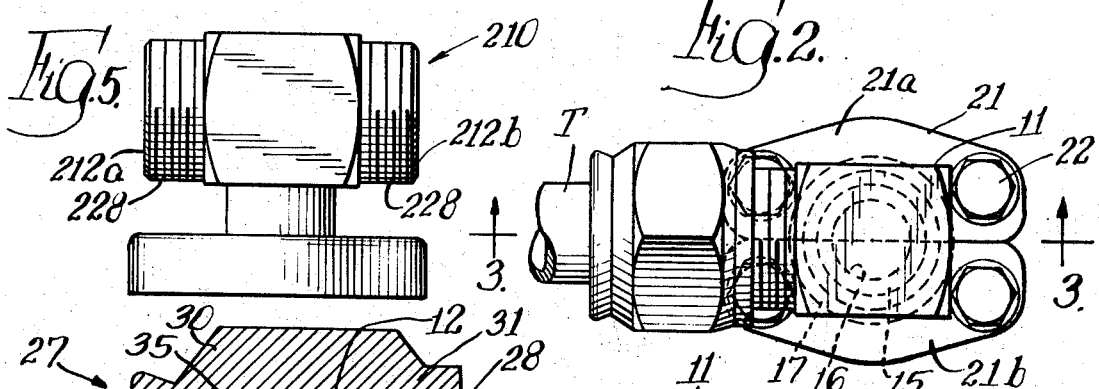
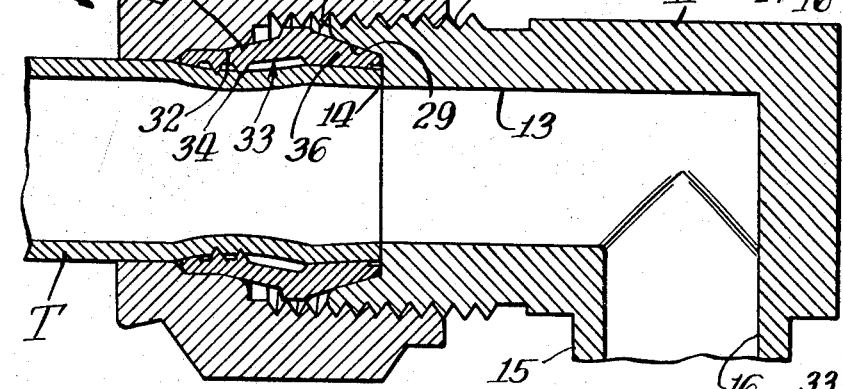
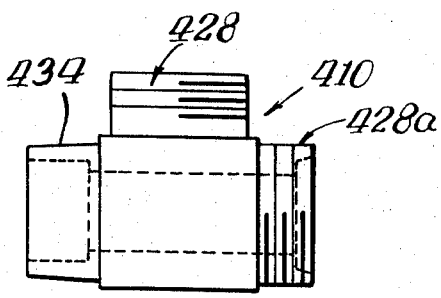
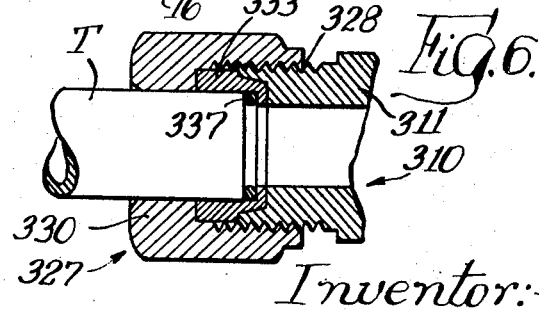
Inventor:—
Thomas F. Graffy,
By Hofgren, Wegner, Allen,
Stellman & McCord Attys.

3,545,793

FLANGE BREAKAWAY FITTING

BACKGROUND OF THE INVENTION

1. Field of the Invention

This invention relates to fittings and in particular to fluid flow fittings including a swivel type connector adapted for connection to a port member.

2. Description of the Prior Art

One well-known form of hydraulic flange fitting comprises a four bolt split flange connection wherein the fitting body is provided with a tubular projection having a radially enlarged flange and adapted to be sealingly connected to a port member by a split clamp. The clamp is arranged to be bolted to the port member in overlying relationship to the flange to urge the flange sealingly against the port member about the port opening. Sealing means may be provided in the form of an O-ring conventionally carried by either the flange member or port member to sealingly engage the other member when the flange member is so clamped to the port member.

The conventional hydraulic flange fittings are arranged to be permanently connected to the end of a duct such as a tube, pipe or hose with the swivel capabilities of the flange structure permitting facilitated connection of the duct to the port such as where disalinement or similar inaccuracies of disposition of the hose end occur.

SUMMARY OF THE INVENTION

The present invention comprehends an improved fluid flow flange fitting including means for permitting a breakaway connection of the duct to the fitting body for facilitated connection and disconnection of the duct thereto to provide improved utility of the fitting. The breakaway connection may comprise any suitable breakaway construction such as a threaded constrictible sleeve connection, a brazed seal connection, etc. Thus, the present invention provides a utility heretofore not provided by the permanent duct connection flange fittings of the art.

BRIEF DESCRIPTION OF THE DRAWINGS

Other features and advantages of the invention will be apparent from the following description taken in connection with the accompanying drawing wherein:

FIG. 1 is a side elevation of a flange fitting embodying the invention sealingly connected to a portion of the port member;

FIG. 2 is a top plan view thereof;

FIG. 3 is a fragmentary enlarged diametric section thereof taken substantially along the line 3—3 of FIG. 2;

FIG. 4 is a side elevation of a modified form of flange fitting embodying the invention;

FIG. 5 is a side elevation of another modified form of flange fitting embodying the invention;

FIG. 6 is a fragmentary diametric section illustrating a modified form of breakaway connection for use in the flange fitting embodying the invention; and FIG. 7 is a top plan view of another modified form of fitting embodying the invention.

DESCRIPTION OF THE PREFERRED EMBODIMENTS

In the exemplary embodiments of the invention as disclosed in the drawing, a number of different forms of flange fittings are provided with different breakaway tube connections. More specifically, as shown in the embodiments of FIGS. 1—3, a flange fitting, generally designated 10, includes a body 11 provided with a surface portion 12 and a bore 13 having an opening 14 in the surface portion 12. The body 11 includes a tubular projection 15 defining a passage 16 communicating with the bore 13. The extension 15 includes a radially enlarged flange head 17 defining an outer face 18. The head 17 is clamped to a port member 19 defining a port 20 by means of a flange clamp 21, which, as shown in FIG. 1, is secured to the port member 19 by bolts 22. Lock washers 23 may be provided for maintaining the secured connection. The clamp 21 may comprise a unitary clamp movably retained on the extension 15 between the body 11 and the flange head 17 and including a stepped shoulder 24 bearing against the flange head 17 as shown in FIG. 1. Alternatively, as shown in FIG. 2 in broken lines, the clamp 21 may comprise a pair of split flange clamp halves 21a and 21b which may be installed in association with the body 11 by placement about the extension 15 from opposite sides thereof. The head 17 may be provided with an annular outwardly opening channel 25 in which an O-ring 26 is received for providing sealing connection between the flange head 17 and the port member 19.

As shown in FIG. 3, the body 11 is provided with a breakaway connection, generally designated 27, for connecting a duct such as tube T to the body 11 to have communication with bore 13 through opening 14. Thus, body 11 is provided with an exteriorly threaded portion 28 and an internal frustoconical seating surface 29 defining an extension of bore 13 opening into end 12. The connection 27 includes a nut 30 having an internally threaded portion 31 for threaded association with body portion 28 and a camming surface 32. The connection 27 further includes a sleeve, generally designated 33, coaxially disposed between nut camming surface 32 and body seat 29. The sleeve 33 includes a plurality of radially inwardly projecting annular ribs 34 arranged to be constricted into the tube T as the result of an advancement of nut 30 on body portion 28 forcing camming surface 32 thereof against the outer end 35 of the sleeve, as shown in FIG. 3. At the same time, such threaded advancement of nut 30 urges the nose 36 of the sleeve sealingly against the seating surface 29 and cams the nose into tight sealing engagement with the distal end of the tube T. Thus, the sleeve 33 is effectively sealingly connected to the tube and while yet the connection may be readily disassembled by reverse threading of nut 30 to permit axial withdrawal from body end 12 of the assembled tube and sleeve and loosely retained nut.

Referring now to FIG. 4, a modified form of fitting, generally designated 110, embodying the invention is shown to comprise a fitting generally similar to fitting 10 except that the means for connecting a duct removably thereto comprises a portion 112 which extends coaxially to tubular projection 115 permitting the duct to extend directly away from the port rather than at right angles thereto, as in fitting 10. The surface portion 112 is defined by an external thread 128 for cooperation with a connection means 27.

In FIG. 5, a further modified fitting, generally designated 210, is shown to comprise a fitting generally similar to fitting 10 but having a pair of end surfaces 212a and 212b each defined by an external thread 228 to permit connection of a pair of ducts by breakaway connecting means, such as connection means 27.

Another form of breakaway connection means is illustrated in FIG. 6 wherein the sleeve 333 is adapted to be sealingly connected to the end of tube T by a connection means 327 utilizing brazing means 337. The nut 330 is threaded onto the threaded body portion 328 to retain the sleeve in sealed association with the body 311 subsequent to the brazed connection of the sleeve to the tube end. Thus, fitting 310 of FIG. 6 differs from fitting 10 in providing a brazed connection of the sleeve to the tube end rather than a constricted connection of the sleeve to the tube end.

Referring now to FIG. 7, a further modified form of fitting, generally designated 410, is shown to be arranged for connection thereto of three ducts. Thus, one connection may be similar to that of fitting 10 wherein the threaded end 428 is arranged for use with a connection means 27, as shown in FIG. 3, and a second threaded end 428a may be arranged for use with a connection means 327, as shown in FIG. 6. The third connection may comprise a socket weld means 438 for use in welding end of the tube permanently thereto. Thus, the invention comprehends providing in the fitting not only breakaway connection means, but also permanent connection means in combination with breakaway connection means. The specific combination of FIG. 7 is illustrative only, if being understood that the different connection means may be employed in any combination, as desired.

Thus, the fittings 10, 110, 210, 310, and 410, are similar except as discussed above, and similar elements thereof are identified by similar reference numerals except 100 different. In each of the disclosed fittings, the swivel flange type fitting is combined with one or more breakaway connection means to provide the improved flexibility of connection as discussed above. Each of the fittings is extremely simple and economical of construction while yet providing the above discussed advantages over the fittings of the prior art.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. A one-piece body for use in a fluid flow fitting, comprising an L-member having: a first portion defining a first end portion; a first bore extending through said first portion of the L-member and opening through said first end portion; an annular flange head concentrically about said bore on said first end portion and defining an axially outwardly opening annular seal receiving recess; a second portion extending perpendicular to said first L-member portion and defining a second end portion; a second bore extending through said second portion of the L-member perpendicular to and communicating with said first bore and opening through said second end portion, said first and second bores having substantially constant similar diameters; a frustoconical sealing surface in said second end portion opening through the outer end of said second bore; and a thread on said second portion radially concentrically outwardly of said sealing surface, the axis of said sealing surface and thread being perpendicular to the axis of the said flange head.